United States Patent
Accardo et al.

(10) Patent No.: US 9,635,252 B2
(45) Date of Patent: Apr. 25, 2017

(54) LIVE PANORAMIC IMAGE CAPTURE AND DISTRIBUTION

(71) Applicant: Disney Enterprises, Inc., Burbank, CA (US)

(72) Inventors: Anthony M. Accardo, Glendale, CA (US); Vincent Roberts, Thousand Oaks, CA (US); Bogdan Frusina, Kitchener (CA); Scott Lance Van Nostrand, Plano, TX (US); Myles McGovern, Vernon (CA)

(73) Assignees: Disney Enterprises, Inc., Burbank, CA (US); Immersive Media Company, Vancouver, WA (US)

( * ) Notice: Subject to any disclaimer, the term of this patent is extended or adjusted under 35 U.S.C. 154(b) by 240 days.

(21) Appl. No.: 14/036,926

(22) Filed: Sep. 25, 2013

(65) Prior Publication Data

US 2014/0307046 A1 Oct. 16, 2014

Related U.S. Application Data

(60) Provisional application No. 61/812,658, filed on Apr. 16, 2013.

(51) Int. Cl.
*H04N 5/262* (2006.01)
*H04N 5/232* (2006.01)

(52) U.S. Cl.
CPC ......... *H04N 5/23238* (2013.01); *H04N 5/262* (2013.01)

(58) Field of Classification Search
CPC ........... H04N 21/2187; H04N 21/6131; H04N 21/4223; H04W 4/06
See application file for complete search history.

(56) References Cited

U.S. PATENT DOCUMENTS

| | | | |
|---|---|---|---|
| 8,106,936 B2* | 1/2012 | Strzempko | G06T 3/4038 348/36 |
| 2006/0034367 A1* | 2/2006 | Park | H04N 19/61 375/240.01 |
| 2006/0176861 A1* | 8/2006 | Schmidt | H04L 5/0005 370/337 |
| 2009/0290024 A1* | 11/2009 | Larson | H04N 1/00132 348/159 |
| 2010/0075593 A1* | 3/2010 | Lee | H04H 60/37 455/3.06 |
| 2010/0299630 A1 | 11/2010 | McCutchen | |
| 2011/0069147 A1* | 3/2011 | Lin | G03B 37/04 348/36 |

FOREIGN PATENT DOCUMENTS

WO    WO 2012/051566    4/2012

\* cited by examiner

*Primary Examiner* — Obafemi Sosanya
(74) *Attorney, Agent, or Firm* — Farjami & Farjami LLP (57) ABSTRACT

There is provided a system and a method for use by the system to provide live panoramic image capture and distribution. In one implementation, such a method includes capturing multiple perspectives of a visual environment, combining at least a subset of those perspectives to produce a panoramic image of the visual environment, and encoding the panoramic image to generate panoramic image data. The method also includes transmitting the first panoramic image data to a routing and processing portal for distribution of the panoramic image in real-time.

18 Claims, 7 Drawing Sheets

LIVE PANORAMIC IMAGE CAPTURE AND DISTRIBUTION

RELATED APPLICATIONS

The present application claims the benefit of and priority to a Provisional Patent Application Ser. No. 61/812,658, filed Apr. 16, 2013, and titled "Computational Design of Mechanical Automata," which is hereby incorporated fully by reference into the present application.

BACKGROUND

Events of significant public interest often, and in fact usually, occur at locations remote from news broadcasting studios or other fixed newsgathering and distribution facilities. In order to provide reportage from locations where news is actually happening, newsgathering organizations typically employ specially equipped mobile resources, such as news vehicles having microwave and/or satellite communications capability, to provide live or real-time video coverage of remote newsworthy events as they unfold. Despite their great utility, news vehicles conventionally equipped with microwave and/or satellite communications systems are very expensive, and each one may represent a substantial investment of precious financial resources. Consequently, there is a relatively low upper limit to the number of conventionally equipped news vehicles that any single news organization can afford to field.

Nevertheless, and particularly in urban areas and their environs having dispersed populations, significant events may tend to occur often and may occur concurrently in locations remote both from the newsgathering facility and from one another. Moreover, the remote locations at which these events occur may be highly dynamic, with action or objects of interest distributed across a wide or even surrounding field of view. Under those circumstances, the capture and distribution of high resolution panoramic video images, such as high definition (HD) panoramic images covering an up to three hundred and sixty degree (360°) horizontal and up to one hundred and eighty degree (180°) vertical field of view may be highly desirable. However, it is both technically challenging and financially costly to generate live panoramic HD video content and to distribute that live panoramic content in real-time from a remote location. Consequently, at present it is practically impossible for panoramic video content relevant to all or even most events of interest to be captured, processed, and distributed live or in real-time using conventionally equipped news vehicles.

SUMMARY

There are provided systems and methods for providing live panoramic image capture and distribution, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As explained above, in the conventional art, it is both technically challenging and financially costly to generate live panoramic, e.g., up to three hundred and sixty degree (360°) horizontal and up to one hundred and eighty degree (180°) vertical field of view, high resolution video content and to distribute that live panoramic content substantially live or in real-time from a remote location. The present application is directed to systems and methods for providing live panoramic image capture and low latency real-time or live distribution. Moreover, some implementations of the systems and methods disclosed by the present application provide relatively inexpensive live panoramic image capture and distribution when compared to conventional solutions, thereby enabling use of the present concepts to provide economical, cost effective, coverage of multiple concurrent events of interest occurring at different locations.

Figure 1:
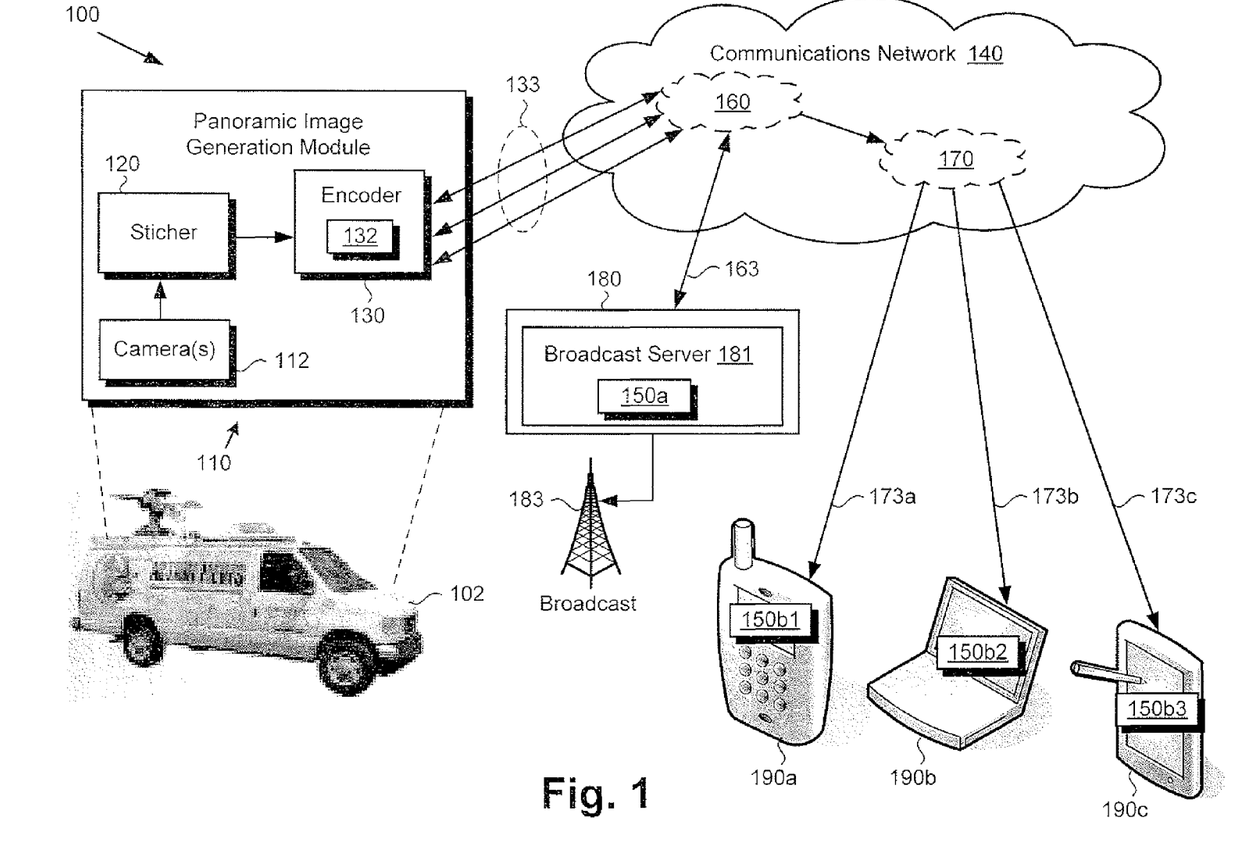
FIG. 1 shows a diagram of one exemplary implementation of a system for providing live panoramic image capture and distribution.

FIG. 1 shows one exemplary implementation of system 100 for providing live panoramic image capture and distribution. System 100 includes panoramic image generation module 110, transmission path or paths 133, routing and processing portal 160 accessible through communications network 140, panoramic image rendering module 150a, and broadcast facility 180 including broadcast server 181 and providing broadcast 183.

As shown in FIG. 1, in some implementations, system 100 may further include panoramic image rendering modules 150b1, and/or 150b2, and/or 150b3 (hereinafter "panoramic image rendering modules 150b1-150b3") for use by respective personal communication devices 190a, 190b, and 190c (hereinafter "personal communication devices 190a-190c"), and mobile platform 102 for transporting panoramic image generation module 110 to a remote event location of interest. Also shown in FIG. 1 are content distribution network (CDN) 170, communication link 163 interactively coupling broadcast facility 180 to routing and processing portal 160 over communication network 140, and communication links 173a, 173b, and 173c (hereinafter "communication links 173a-173c") coupling respective personal communication devices 190a-190e to CDN 170 over communication network 140. Communication network 140 may be a packet network such as the Internet, for example.

According to the implementation shown in FIG. 1, panoramic image generation module 110 includes camera(s) 112, stitcher unit 120, and encoder 130 generating panoramic image data 132. Panoramic image generation module 110 is configured to utilize camera(s) 112, stitcher unit 120, and encoder 130 to enable distribution of an up to 360° horizontal and up to 180° vertical panoramic image in real-time or substantially live. That is to say, panoramic image generation module 110 is configured to capture multiple perspectives of its visual environment using camera(s) 112, to combine at least a subset of those perspectives to produce a panoramic image of the visual environment using stitcher unit 120, and to encode the panoramic image using encoder 130 to generate panoramic image data 132. Panoramic image generation module 110 is also configured to transmit panoramic image data 132 to routing and processing portal 160 over transmission path(s) 133 for distribution of the up to 360° horizontal and up to 180° vertical panoramic image in real-time or substantially live. As will be described in greater detail below, in one implementation, transmission path(s) 133 may be provided by one or more bonded cellular networks.

Figure 2A:
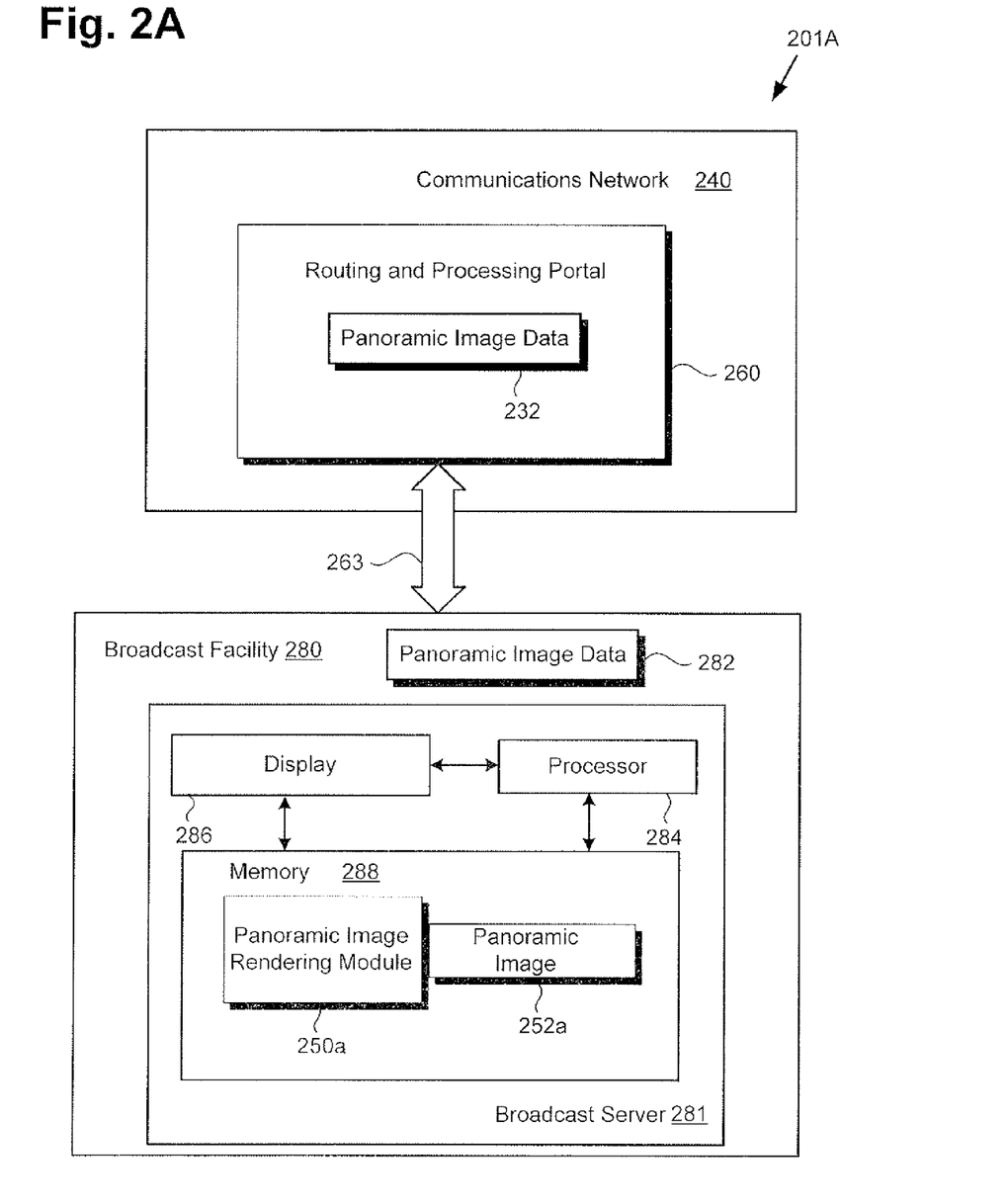
FIG. 2A shows a more detailed example of a portion of the exemplary system for providing live panoramic image capture and distribution shown in FIG. 1.

Turning now to FIG. 2A, FIG. 2A shows a more detailed example of a portion of system 100 for providing live panoramic image capture and distribution, in FIG. 1. Panoramic image distribution environment 201A in FIG. 2A, shows broadcast facility 280 including broadcast server 281 communicating with routing and processing portal 260 via communication link 263 and communications network 240. Routing and processing portal 260 is shown to include panoramic image data 232, while broadcast facility 280 is shown to include panoramic image data 282 for use by broadcast server 281. Broadcast server 281 includes processor 284, display 286, and panoramic image rendering module 250a stored in memory 288 and providing panoramic image 252a corresponding to panoramic image data 282.

Communications network 240, processing and routing module 260, communication link 263, broadcast facility 280, and broadcast server 281 including panoramic image rendering module 250a correspond respectively to communications network 140, processing and routing module 160, communication link 163, broadcast facility 180, and broadcast server 181 including panoramic image rendering module 150a, in FIG. 1. In addition, panoramic image data 232 corresponds to panoramic image data 132 generated by encoder 130 and transmitted to routing and processing portal 160 over communication path(s) 133, in FIG. 1.

Panoramic image data 282 corresponds in general to panoramic image data 132/232. However, it is noted that panoramic image data 282 may be re-encoded panoramic image data, and thus may represent a different version of the panoramic image data corresponding to the panoramic image produced by stitcher unit 120. That is to say, panoramic image data 132/232 may be characterized as a "first panoramic image data" while panoramic image data 282 may be characterized as a "second panoramic image data."

According to the implementation shown in FIG. 2A, communication link 263 represents transfer of panoramic image data 232 from processing and receiving portal 260 to broadcast facility 280 over communications network 240. Once transferred, panoramic image data 232 may be used to generate panoramic image data 282, which may in turn be utilized by panoramic image rendering module 250a to render panoramic image 252a as a substantially live panoramic image. Some or all of substantially live panoramic image 252a may then be provided to a television (TV) audience for viewing, for example as part of broadcast 183, in FIG. 1. It is noted that communication link 263 is shown as a two-way communication link to represent transfer of data corresponding to broadcast server requests for additional or enhanced resolution panoramic imagery, as will be described further below.

Processor 284 may be the central processing unit for broadcast server 281, for example, in which role processor 284 runs the broadcast server operating system and facilitates use of panoramic image rendering module 250a. Display 286, under the control of processor 284, may be configured to display panoramic image 252a to a news producer or other authorized personnel of broadcast facility 280, for selection of one or more panoramic image views for broadcasting to the TV or other media audience.

Figure 2B:
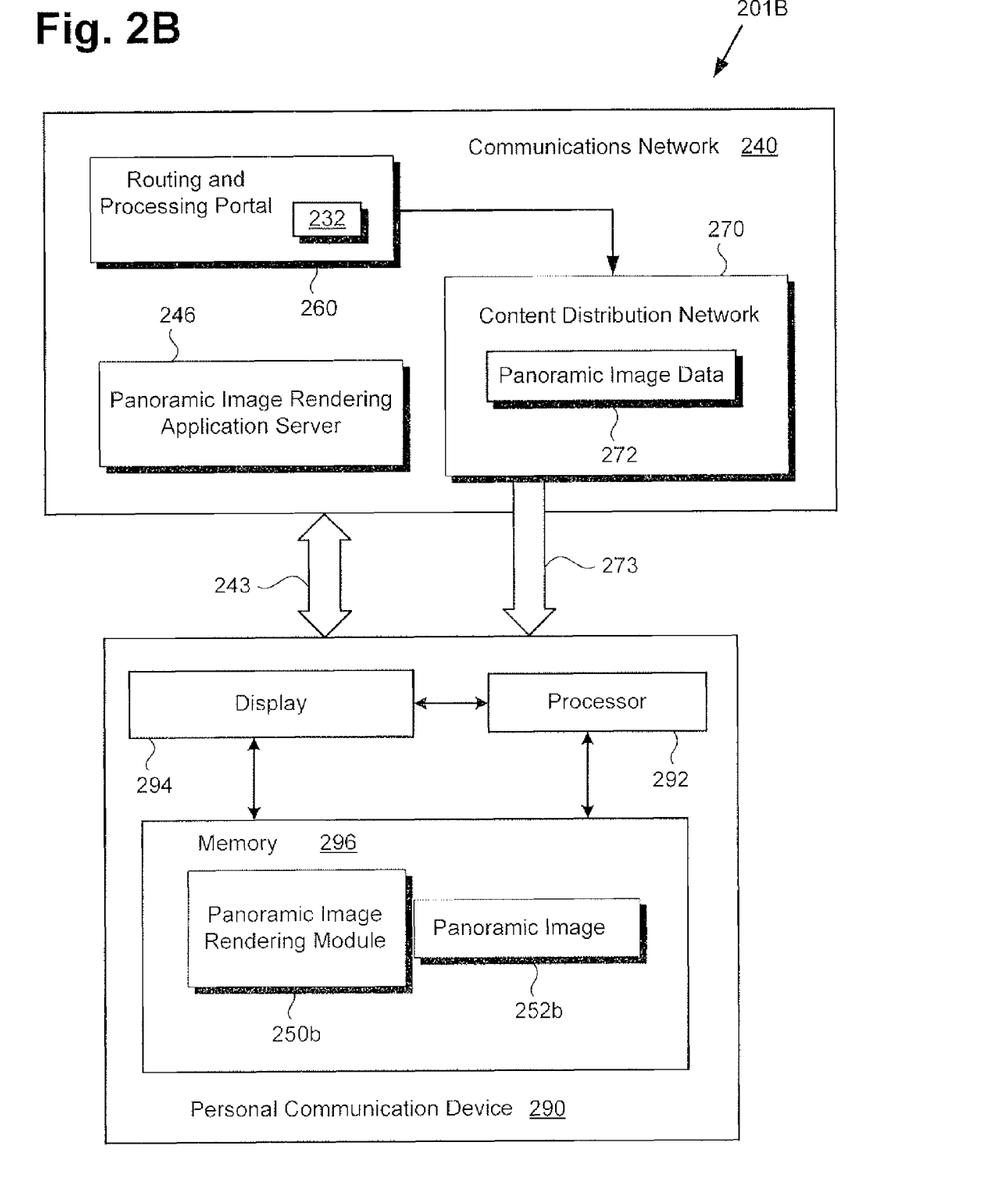
FIG. 2B shows a more detailed example of a portion of the exemplary system for providing live panoramic image capture and distribution shown in FIG. 1.

Continuing to FIG. 2B, FIG. 2B shows a more detailed example of a portion of system 100 for providing live panoramic image capture and distribution, in FIG. 1. Panoramic image distribution environment 201B, in FIG. 2B, shows personal communication device 290 receiving communications from CDN 270 via communication link 273 and communications network 240. CDN 270 is shown to include panoramic image data 272, while personal communication device 290 is shown to include processor 292, display 294, and panoramic image rendering module 250b stored in memory 296 and providing panoramic image 252b. Also shown in FIG. 2B are panoramic image rendering application server 246 accessible to personal communication device 290 over communications network 240 via communication link 243.

CDN 270, communication link 273, and personal communication device 290 including panoramic image rendering module 250b correspond respectively to CDN 170, any of communication links 173a-173c, and any of personal communication devices 190a-190c including respective panoramic image rendering modules 150b1-150b3, in FIG. 1. In addition, communications network 240 and routing and processing portal 260 including panoramic image data 232 are the same features shown in FIG. 2A, and thereby correspond respectively to communications network 140 and routing and processing portal 160 including panoramic image data 132, in FIG. 1. Moreover, panoramic image data 272 corresponds in general to panoramic image data 132/232 generated by encoder 130, in FIG. 1. However, as is the case for panoramic image data 282, in FIG. 2A, panoramic image data 272 may be re-encoded panoramic image data, and thus may represent a different version of the panoramic image data corresponding to the panoramic image produced by stitcher unit 120. Consequently, in some implementations, when panoramic image data 132/232 is characterized as a first panoramic image data, panoramic image data 272 may be characterized as a second panoramic image data.

According to the implementation shown in FIG. 2B, communication link 273 represents transfer of panoramic image data 272 from CDN 270 to personal communication device 290 over communications network 240. Once transferred, panoramic image data 272 may be utilized by panoramic image rendering module 250b to render panoramic image 252b as a real-time panoramic image, some or all of which may then be displayed to a user of personal communication device 290.

Communication link 243 is shown as a two-way communication link to represent data transfer independent of CDN 270. For example, communication link 243 may be used by personal communication device 290 to obtain panoramic image rendering module 250b and/or updates to panoramic image rendering module 250b as one or more downloads from panoramic image rendering application server 246.

Processor 292 may be the central processing unit for personal communication device 290, for example, in which role processor 292 runs the personal communication device operating system and facilitates use of panoramic image rendering module 250b. Display 294, under the control of processor 292, may be configured to display one or more panoramic views selected from panoramic image 252b by a user of personal communication device 290. Personal communication device 290 may take the form of a desktop computer, a Smart TV, a laptop computer, a netbook, a tablet computer, a gaming console, or a Smartphone, for example.

Figure 3:
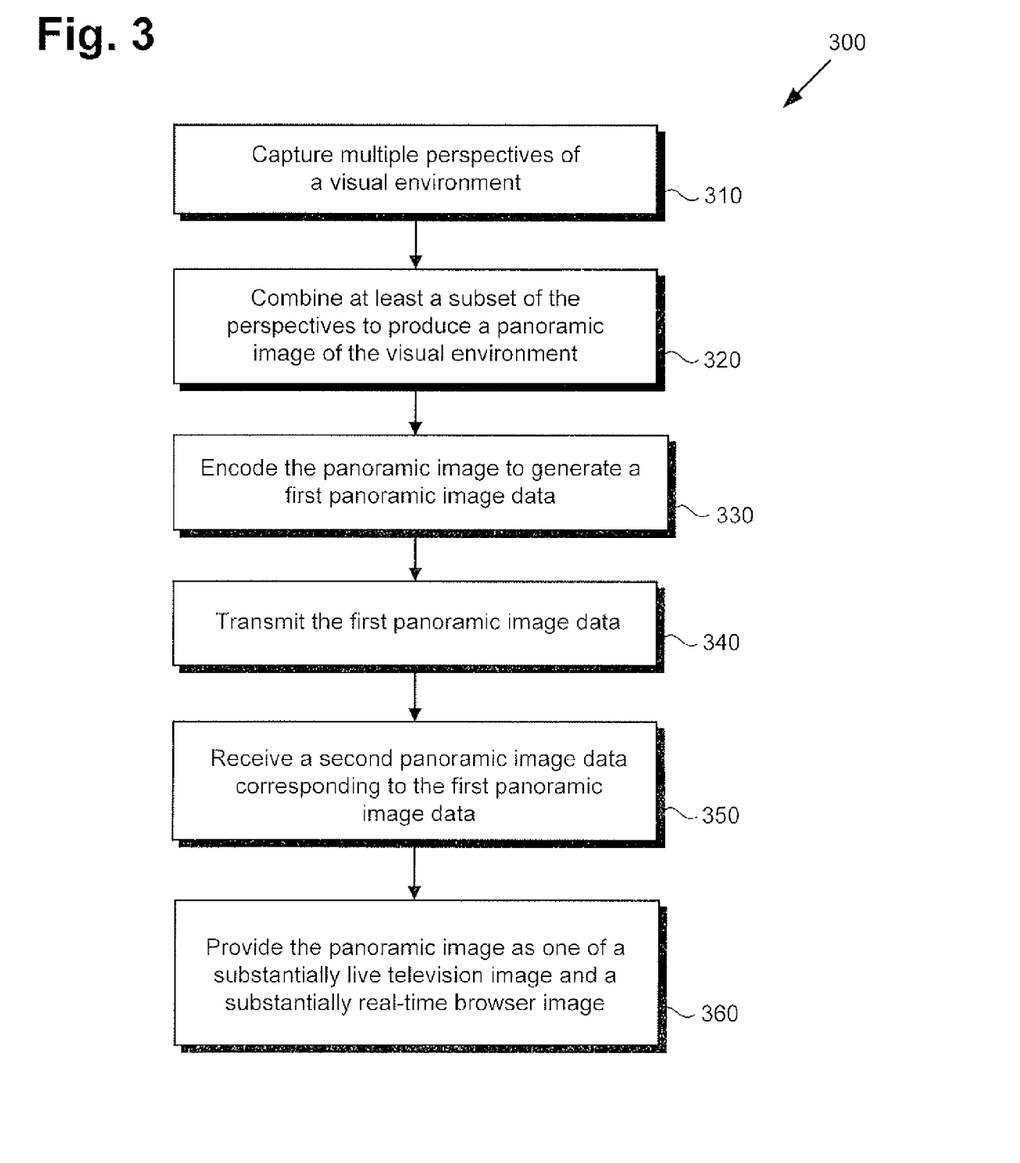
FIG. 3 is a flowchart presenting an exemplary method for use by a system to provide live panoramic image capture and distribution.
Figure 4:
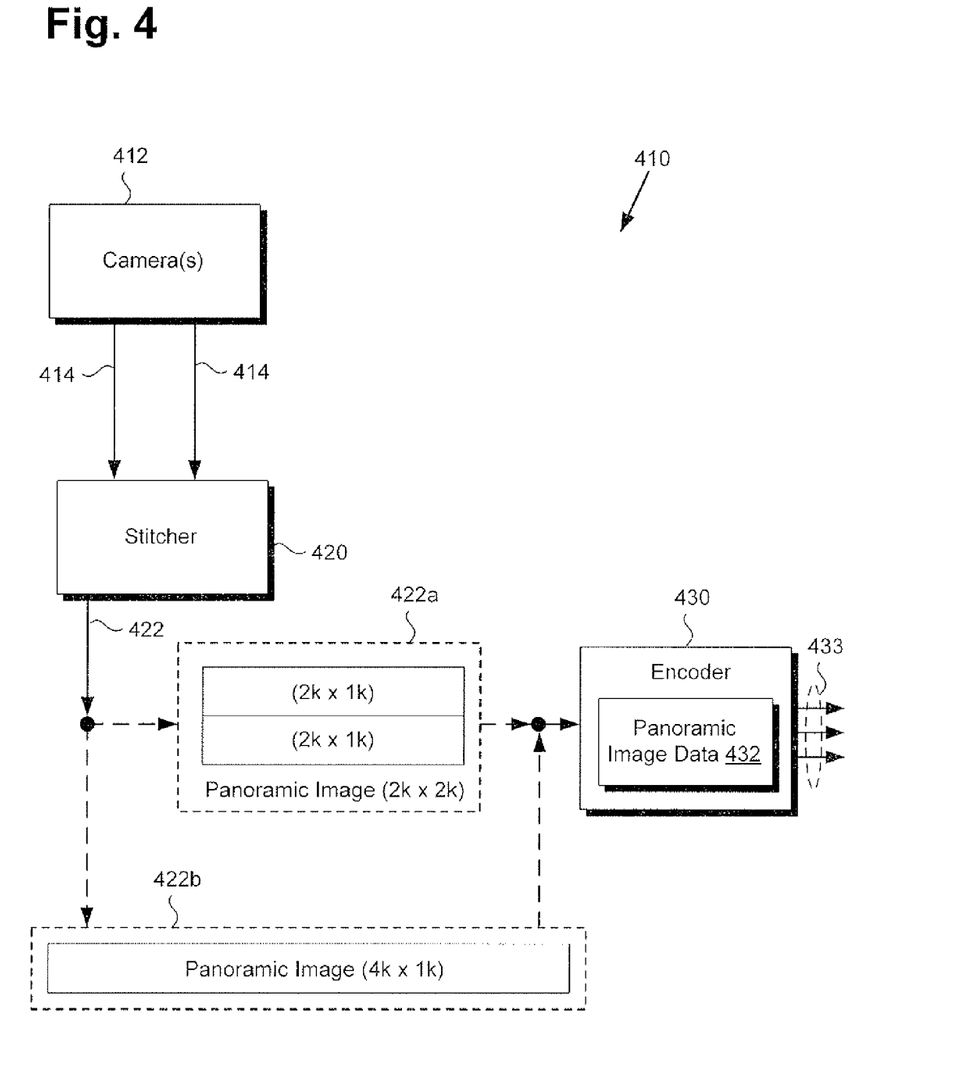
FIG. 4 shows a more detailed example of a panoramic image generation module suitable for use in the exemplary system of FIG. 1.

FIGS. 1, 2A, and 2B, will be further described by reference to FIGS. 3 and 4. FIG. 3 shows a flowchart presenting an exemplary method for use by a system to provide live panoramic image capture and distribution, while FIG. 4 shows a more detailed example of a panoramic image generation module suitable for use in the exemplary system of FIG. 1. FIG. 4 shows panoramic image generation module environment 410 including camera(s) 412, stitcher unit 420 producing panoramic image 422a or 422b, and encoder 430 generating panoramic image data 432. FIG. 4 also shows transmission path(s) 433 for output of panoramic image data 432 by encoder 430. Transmission path(s) 433 and panoramic image generation module environment 410 including camera(s) 412, stitcher unit 420, and encoder 430 generating panoramic image data 432 correspond respectively to transmission path(s) 133 and camera(s) 112, stitcher unit 120, and encoder 130, and panoramic image data 132, of panoramic image generation module 110, in FIG. 1.

With respect to the method outlined in FIG. 3, it is noted that certain details and features have been left out of flowchart 300 in order not to obscure the discussion of the inventive features in the present application. Referring to FIG. 3 in combination with FIGS. 1 and 4, flowchart 300 begins with capturing multiple perspectives of a visual environment (310). Capture of the environmental perspectives may be performed by panoramic image generation module 110/410, using camera(s) 112/412.

It is noted that although depicted as camera(s) 112/412, in respective FIGS. 1 and 4, more generally, camera(s) 112/412 may correspond to any suitable image capture device(s) configured to capture up to a 360° horizontal and up to 180° vertical panoramic view. Thus, as shown by FIGS. 1 and 4, such image capture devices may be configured to use a pixel based image capture technology and may be implemented using one or more cameras 112/412. Cameras 112/114 may be arranged in any geometry enabling capture of multiple perspectives of the visual environment surrounding panoramic image generation module 110/410. However, in other implementations, camera(s) 112/412 can correspond to any image capture technology capable of generating digital imagery.

Camera(s) 112/412 can be used to capture perspectives that, in the aggregate, capture an up to 360° horizontal and up to 180° vertical panoramic view, such as a 180°, or 270° horizontal and 120° vertical panorama, for example, of the surroundings of panoramic image generation module 110/410. Those perspectives may be captures as high resolution, or lower resolution, images. For example, the perspectives captured by camera(s) 112/412 may be captured as high definition (HD) or standard definition (SD) video images, for example. However, in other implementations, other, higher resolution formats may be used. For example, the perspectives captured by camera(s) 112/412 may be captured at 2 k resolution, or as 4 k resolution, i.e., ultra high definition (Ultra HD) video images, as known in the art.

Flowchart 300 continues with combining at least a subset of the perspectives captured by camera(s) 112/412 to produce panoramic image 422a or 422b of the visual environment (320). The combining or "stitching" of some or all of the perspectives captured by camera(s) 112/412 may be performed by panoramic image generation module 110/410, using stitcher unit 120/420. The perspectives captured by camera(s) 112/412 may be transmitted over a physical connection, such as an Ethernet or High-Definition Multimedia Interface (HDMI) connection from camera(s) 112/412 to stitcher unit 120/420. Stitcher unit 120/420 may be implemented by computer hardware including one or more processors dedicated to stitching functionality and a memory having stored therein a panoramic image stitching application (stitcher unit processor(s), memory, and software applications not shown in FIG. 1 or 4).

According to the implementations shown in FIGS. 1 and 4, stitcher unit 120/420 can be used to combine one or more of, i.e., at least a subset of, the individual perspectives captured by camera(s) 112/412 into a smooth, up to 360° horizontal and up to 180° vertical stitched panoramic image of the visual environment surrounding panoramic image generation module 110. For example, in one implementation, individual perspectives can be stitched together to form a spherical or cylindrical panoramic image. As shown by FIG. 4, stitcher unit 420 may be configured to produce panoramic image 422a having a standard broadcast format, or panoramic image 422b having a non-standard broadcast format. For example, panoramic image 420b may be an elongated 3840×540 image. Moreover, in some implementations, the up to 360° horizontal and up to 180° vertical stitched panoramic image may include multiple focal points.

In some implementations, stitcher unit may be configured to split elongated panoramic image 422b in half and stack the panoramic image halves to provide panoramic image 422a in a Society of Motion Picture and Television Engineers (SMPTE) standard format, such as 1920×1080, for example. It is noted that in some implementations, splitting and stacking of non-standard format panoramic image 422a to provide standard SMPTE format panoramic image 422b may be performed by encoder 430.

Flowchart 300 continues with encoding panoramic image 422a/422b to generate panoramic image data 132/432 (330). The encoding may be performed by panoramic image generation module 110/410, using stitcher unit 130/430. Encoder 130/430 can be used to compress and encode the frame buffer corresponding to panoramic image 422a/422b to produce panoramic image data 132/432. In some implementations, encoding may include utilizing a higher compression resolution around the focal portion of panoramic image 422a/422b, and fewer bits about the auto-focused portion(s). Selective compression resolution may be achieved using edge detection and/or sharpness detection techniques, for example. Analogously to stitcher unit 120/420, encoder 130/430 may be implemented by computer hardware including one or more processors dedicated to encoding functionality and a memory having stored therein panoramic image encoding instructions (encoder processor(s), memory, and encoding instructions not shown in FIG. 1 or 4).

Flowchart 300 continues with transmitting panoramic image data 132/432 (340). Referring to FIG. 1, after panoramic image data 132 is produced, panoramic image generation module 110 can be configured to transmit the panoramic image data to routing and processing portal 160 using one or multiple transmission path(s) 133. For example, in one implementation, panoramic image generation module 110 may be configured to packetize panoramic image data 132 for transmit using one or more bonded cellular networks as transmit path(s) 133. In other implementations, panoramic image generation module 110 may be configured to transmit panoramic image data 132 as a single data packet or as multiple data packets using one of satellite aggregated transmission or microwave transmission, for example. Moreover, in other implementations, panoramic image generation module 110 may be configured to transmit panoramic image data 132 as multiple data packets using any combination of suitable transmission modes, such as bonded cellular technology in combination with one or more other wireless transmission modes.

It is noted that panoramic image generation module 110 is contemplated to function as a remote panoramic image capture resource suitable for deployment as a fixed or portable field resource, for example. In some implementations, for example news gathering, it may be advantageous or desirable to implement panoramic image generation module 110 on a mobile platform, such as optional mobile platform 102, shown as a news gathering vehicle in FIG. 1.

Referring to FIGS. 2A and 2B in combination with FIGS. 1 and 4, panoramic image data 132 transmitted by panoramic image generation module 110 is routed and may be processed through routing and processing portal 160/260. Routing and processing portal 160/260 can route panoramic image data 132/232/432 to a processing resource in a cloud hosted scalable environment and/or to a processing resource situated in physical broadcast facility 280. The processing resource to which routing and processing portal 160/260 routes panoramic image data 132/232/432 can be configured to aggregate panoramic image data 132/232/432 if it was packetized, and to send panoramic image data 132/232/432 to a decoder that can output a frame buffer corresponding to the frame buffer of panoramic image 422*a*/422*b* produced in panoramic image generation module 410.

Flowchart 300 continues with receiving panoramic image data 282 or 272 corresponding generally to panoramic image data 132/232/432 (350). If the receiving is performed by panoramic image rendering module 250*a* on broadcast server 281, second panoramic image data 282 may include a frame buffer to be broadcast as substantially live panoramic image 252*a*. Panoramic image rendering module 250*a* is configured to receive the frame buffer included in panoramic image data 282, to convert it into the up to 360° horizontal and up to 180° vertical substantially live panoramic image 250*a*, and to display a portion of substantially live panoramic image 250*a* as a substantially live panoramic image view selected by a producer or other authorized personnel of broadcast facility 280.

According to one implementation, the entire frame buffer included in panoramic image data 282 is sent to panoramic image rendering module 250*a*, and panoramic image rendering module 250*a* processes the image for display as substantially live panoramic image 252*a*. One advantage to sending the entire panoramic image frame buffer is that the broadcaster can thereby select any view from within the panorama for substantially live, low latency display to a TV or other media audience.

As shown in FIG. 1, encoder 130 is in communication with routing and processing portal 160 and/or broadcast server 181 of broadcast facility 180 over communication path(s) 133 and communication link 163, at least some of which are bi-directional. Thus, in some implementations, encoder 130 may be configured to receive image enhancement request data through routing and processing portal 160 and/or from broadcast server 181, over communication path(s) 133. Encoder 130 may be further configured to provide higher resolution or otherwise enhanced imagery of a selected portion of up to 360° horizontal and up to 180° vertical panoramic image 242*a* or 242*b*, in real-time, based on the image enhancement request data received from broadcast server 181.

Referring to FIG. 2B, if the receiver is personal communication device 290, panoramic image data 232 may be re-encoded into a Real Time Messaging Protocol (RTMP) or other web stream, which may be a single bit rate or a multiple bit rate web stream, as panoramic image data 272. Panoramic image data 272 can then be delivered to CDN 270, or directly to personal communication device 290 having panoramic image rendering module 250*b* in memory 296. Panoramic image rendering module 250*h* is configured to receive the re-encoded frame buffer included in panoramic image data 272, to convert it into the up to 360° horizontal and up to 180° vertical panoramic image 252*b*, and to display at least a portion of panoramic image 252*h* as a panoramic image view selected by the user of personal communication device 290.

According to one implementation, the entire frame buffer included in panoramic image data 272 is sent to panoramic image rendering module 250*b*, and panoramic image rendering module 250*b* processes panoramic image 252*b* for display. One advantage to sending the entire panoramic image frame buffer as part of panoramic image data 272 is that individual users, such as the respective users of personal communication devices 190*a*-190*c* in FIG. 1, can see the same panoramic image 252*b* but retain the ability to select their own preferred panoramic image view from within the panorama. In other words, different users may select different panoramic image views from the same panoramic image.

Exemplary flowchart 300 concludes with providing panoramic image 252*a* or 252*h* as one of a substantially live TV image and a real-time browser image, respectively (360). As used herein, the distinction between substantially live imagery and real-time imagery is one based on latency. Referring to FIGS. 1 and 2A, when all or a portion of panoramic image 252*a* is provided to a TV or other media audience as broadcast 183, the latency associated with capture and distribution of panoramic image 252*a* may be less than or approximately equal to ten seconds (10 s). As a result, panoramic image 252*a* and any panoramic image views based on panoramic image 252*a* are referred to as "substantially live." Referring to FIG. 2B, when all or a portion of panoramic image 252*b* is provided to a user of personal communication device 290, the latency associated with capture and distribution of panoramic image 252*b* may be more than ten seconds, but less than or approximately equal to sixty seconds (60 s), for example, with a substantial portion of that latency typically due to the user's web browser. As a result, panoramic image 252*b* and any panoramic image views based on panoramic image 252*a* are referred to as real-time panoramic images or image views.

Figure 5:
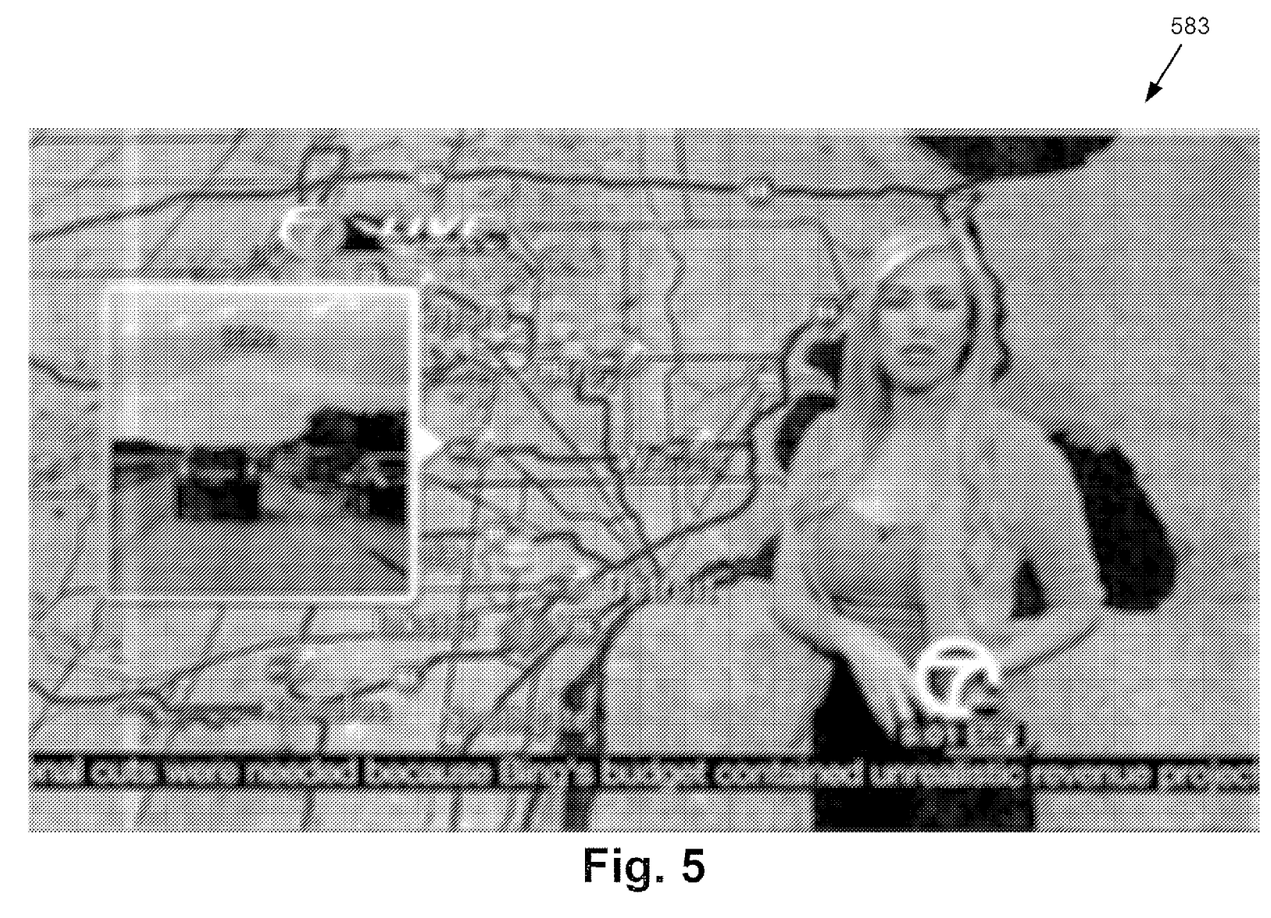
FIG. 5 is an example visual frame from an on air broadcast during which a substantially live panoramic image view is shown.

Continuing to FIG. 5, FIG. 5 shows example visual frame 583 from a live broadcast during which substantially live panoramic image view 552*a* is shown. Visual frame 583 corresponds in general to broadcast 183, in FIG. 1, while panoramic image view 552*a* corresponds in general to panoramic image 252*a*, in FIG. 2A. As noted above, the latency of panoramic image view 552*a* may be less than approximately 10 s.

Figure 6:
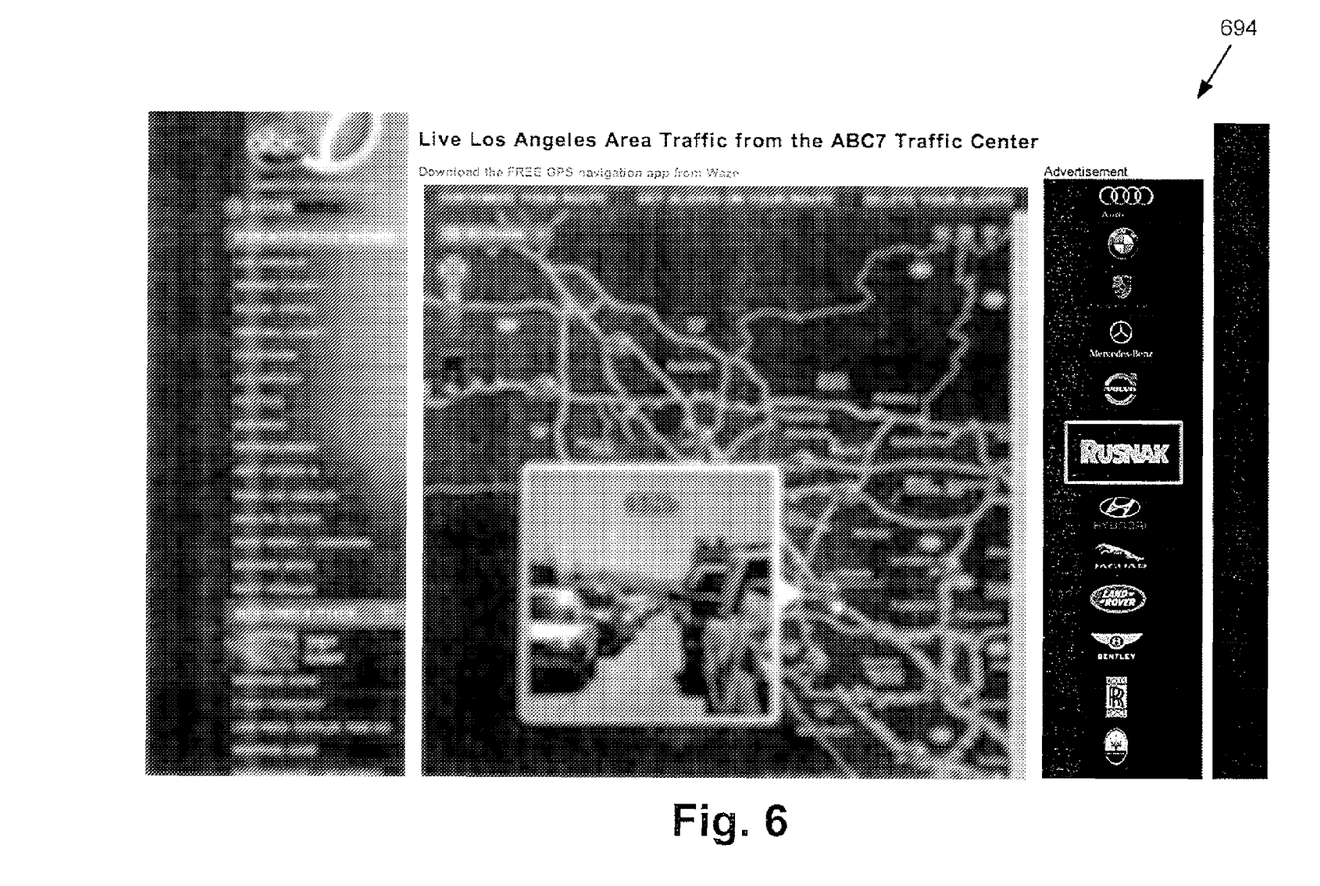
FIG. 6 is an example display image from a personal communication device, in which a substantially real-time panoramic image view is included.

FIG. 6 shows example display image 694 from a personal communication device, in which substantially live panoramic image view 652b is included. Display image 694 corresponds in general to display 294 of personal communication device 290, in FIG. 2B, while panoramic image view 652b corresponds in general to panoramic image 252b in that figure. As noted above, the latency of panoramic image view 652b may be in a range between 10 s and 60 s.

Thus, the present application discloses systems and methods for providing live panoramic image capture and low latency real-time or substantially live distribution. Moreover, some implementations of the systems and methods disclosed by the present application provide relatively inexpensive live panoramic image capture and distribution when compared to conventional solutions. As a result, the concepts disclosed herein enable coverage of multiple concurrent events of interest occurring at different locations, at relatively low cost.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a system to provide live panoramic image capture and distribution, the method comprising:
   capturing a plurality of perspectives of a visual environment;
   combining at least a subset of the plurality of perspectives to produce a panoramic image of the visual environment;
   receiving an image enhancement request data from a broadcast server over a communications network;
   encoding the panoramic image in response to receiving the image enhancement request data to generate a first panoramic image data, wherein the first panoramic image data includes a selectable preferred panoramic image view of the panoramic image;
   transmitting the first panoramic image data to an image routing and processing portal for distribution of the panoramic image in real-time, in response to receiving the image enhancement request data; and
   re-encoding the first panoramic image data to generate a second panoramic image data for transmission to a rendering device.

2. The method of claim 1, wherein the encoding utilizes a higher compression resolution around a focal portion of the panoramic image.

3. The method of claim 1, wherein the panoramic image comprises an up to three hundred and sixty degree (360°) horizontal and up to one hundred and eighty degree) (180° vertical panorama of the visual environment.

4. The method of claim 1, wherein the transmitting is performed using at least one bonded cellular network.

5. The method of claim 1, further comprising providing at least a portion of the panoramic image to a television audience the rendering device as a substantially live panoramic image view.

6. The method of claim 5, wherein a latency of the substantially live panoramic image view is less or approximately equal to ten seconds.

7. The method of claim 1, further comprising providing at least a portion of the panoramic image as a substantially real-time panoramic image view on the rendering device.

8. The method of claim 7, wherein a latency of the substantially real-time panoramic image view is less than or approximately equal to sixty seconds.

9. A system for providing live panoramic image capture and distribution, the system comprising:
   a panoramic image generation module including an image capture device, a stitcher unit, and an encoder, the panoramic image generation module configured to:
   capture, using the image capture device, a plurality of perspectives of a visual environment;
   combine, using the stitcher unit, at least a subset of the plurality of perspectives to produce a panoramic image of the visual environment;
   receive an image enhancement request data from a broadcast server over a communications network;
   encode, using the encoder, the panoramic image in response to receiving the image enhancement request data to generate a first panoramic image data, wherein the first panoramic image data includes a selectable preferred panoramic image view of the panoramic image; and
   transmit the first panoramic image data to a routing and processing portal for distribution of the panoramic image in real-time, in response to receiving the image enhancement request data;
   a module configured to re-encode the first panoramic image data to generate a second panoramic image data for transmission to a rendering device.

10. The system of claim 9, wherein the encoder utilizes a higher compression resolution around a focal portion of the panoramic image.

11. The system of claim 9, wherein the panoramic image generation module is configured to produce an up to three hundred and sixty degree (360°) horizontal and up to one hundred and eighty degree (180°) vertical panorama of the visual environment.

12. The system of claim 9, wherein the panoramic image generation module is configured to transmit the first panoramic image data to the routing and processing portal using at least one bonded cellular network.

13. The system of claim 9, further comprising the routing and processing portal.

14. The system of claim 9, further comprising a broadcast server hosting the panoramic image rendering module, the broadcast server configured to provide at least a portion of the panoramic image to the rendering device as a substantially live panoramic image view.

15. The system of claim 14, wherein a latency of the substantially live panoramic image view is less than or approximately equal to ten seconds.

16. The system of claim 9, wherein the panoramic image rendering module is further configured to provide the panoramic image as a substantially real-time panoramic image view on the rendering device.

17. The system of claim 16, wherein a latency of the substantially real-time panoramic image view is less than or approximately equal to sixty seconds.

18. The system of claim 16, wherein the personal communication device is one of a desktop computer, a smart television (Smart TV), a laptop computer, a netbook, a tablet computer, a gaming console, and a Smartphone.

\* \* \* \* \*

UNITED STATES PATENT AND TRADEMARK OFFICE
CERTIFICATE OF CORRECTION

PATENT NO. : 9,635,252 B2  
APPLICATION NO. : 14/036926  
DATED : April 25, 2017  
INVENTOR(S) : Accardo et al.

Page 1 of 1

It is certified that error appears in the above-identified patent and that said Letters Patent is hereby corrected as shown below:

In the Claims

Column 9, Line 60, "one hundred and eighty) (180°" should be --one hundred and eighty (180°)--

Column 9, Lines 65-66, "to a television audience the rendering device" should be --to the rendering device--

Signed and Sealed this  
Seventeenth Day of April, 2018

Andrei Iancu  
*Director of the United States Patent and Trademark Office*